United States Patent [19]

Terracol et al.

[11] Patent Number: 5,145,047
[45] Date of Patent: Sep. 8, 1992

[54] FLEXIBLE PRODUCTION SYSTEM COMPRISING INDIVIDUALLY MOTORIZED MECHANICAL MODULES WHOSE OPERATION IS SELECTED AND SYNCHRONIZED BY ELECTRONIC MEANS

[75] Inventors: Claude Terracol, Eybens; Kazimir Boch, Meylan; Gérard Gros, Noyarey, all of France

[73] Assignee: Merlin Gerin, France

[21] Appl. No.: 666,478

[22] Filed: Mar. 6, 1991

Related U.S. Application Data

[63] Continuation of Ser. No. 413,076, Sep. 27, 1989, abandoned.

[51] Int. Cl.⁵ ............................................. B65G 43/00
[52] U.S. Cl. ..................................... 198/341; 29/741; 29/759; 29/794; 198/465.1
[58] Field of Search ................... 198/341, 345.1, 465.1, 198/465.2, 465.3; 29/740, 741, 759, 784, 786, 793, 794

[56] References Cited

U.S. PATENT DOCUMENTS

| | | | |
|---|---|---|---|
| 3,934,701 | 1/1976 | Mooney et al. | 198/345 |
| 4,151,907 | 5/1979 | Doty . | |
| 4,197,637 | 4/1980 | Honda | 29/784 X |
| 4,202,092 | 5/1980 | Shibasaki et al. | 198/345 X |
| 4,209,898 | 7/1980 | Aoki et al. | 29/784 X |
| 4,231,153 | 11/1980 | Browne | 29/759 X |
| 4,360,097 | 11/1982 | Brems | 198/345 |
| 4,407,404 | 10/1983 | Rise et al. | |
| 4,460,966 | 7/1984 | Chynoweth et al. | 198/341 X |
| 4,503,596 | 3/1985 | Ida et al. | 198/341 X |
| 4,583,634 | 4/1986 | Kraus et al. | 198/341 |

FOREIGN PATENT DOCUMENTS

| | | |
|---|---|---|
| 0100416 | 4/1985 | European Pat. Off. . |
| 2106948 | 5/1972 | France . |
| 2572976 | 5/1986 | France . |
| 55-100900 | 8/1980 | Japan . |
| 56-52160 | 5/1981 | Japan . |
| 58-15647 | 1/1983 | Japan . |
| 58-215300 | 12/1983 | Japan . |
| 59-227349 | 12/1984 | Japan . |
| 61-152354 | 1/1986 | Japan . |
| 1267651 | 3/1972 | United Kingdom . |
| 8703836 | 7/1987 | World Int. Prop. O. . |

OTHER PUBLICATIONS

Steuerungstechnik, vol. 6, No. 1, Feb. 1973, pp. 11–15, Mainz, DE; J. Sartorius: "Montagemaschinen, ihre Systemauswahl und Steuerungstechnik", p. 15, FIGS. 9, 10.
Soviet Inventions Illustrated, sections General/Mechanical, No. 86303725/46, Nov. 27, 1986, Derwent Publications Ltd., Londres, GB; & SU-A-1 219 323, (Electrotech. Prodn.), Mar. 23, 1986, FIGS. 1, 2.

*Primary Examiner*—D. Glenn Dayoan
*Attorney, Agent, or Firm*—Parkhurst, Wendel & Rossi

[57] ABSTRACT

The production system comprises a lift and carry device (6) and a handling unit (9) each actuated by an electric motor (13, 14), the two motors being synchronized.

The rectangular walking beam lift and carry cycle of the products (1) is perfected by modulation of the speeds limiting the impacts exerted on the product. The vertical movement (M1–M2; M3–M4) of the movable walking beam support (11) present an intermediate low-speed phase corresponding to contact or placing of the product to limit impacts.

3 Claims, 6 Drawing Sheets

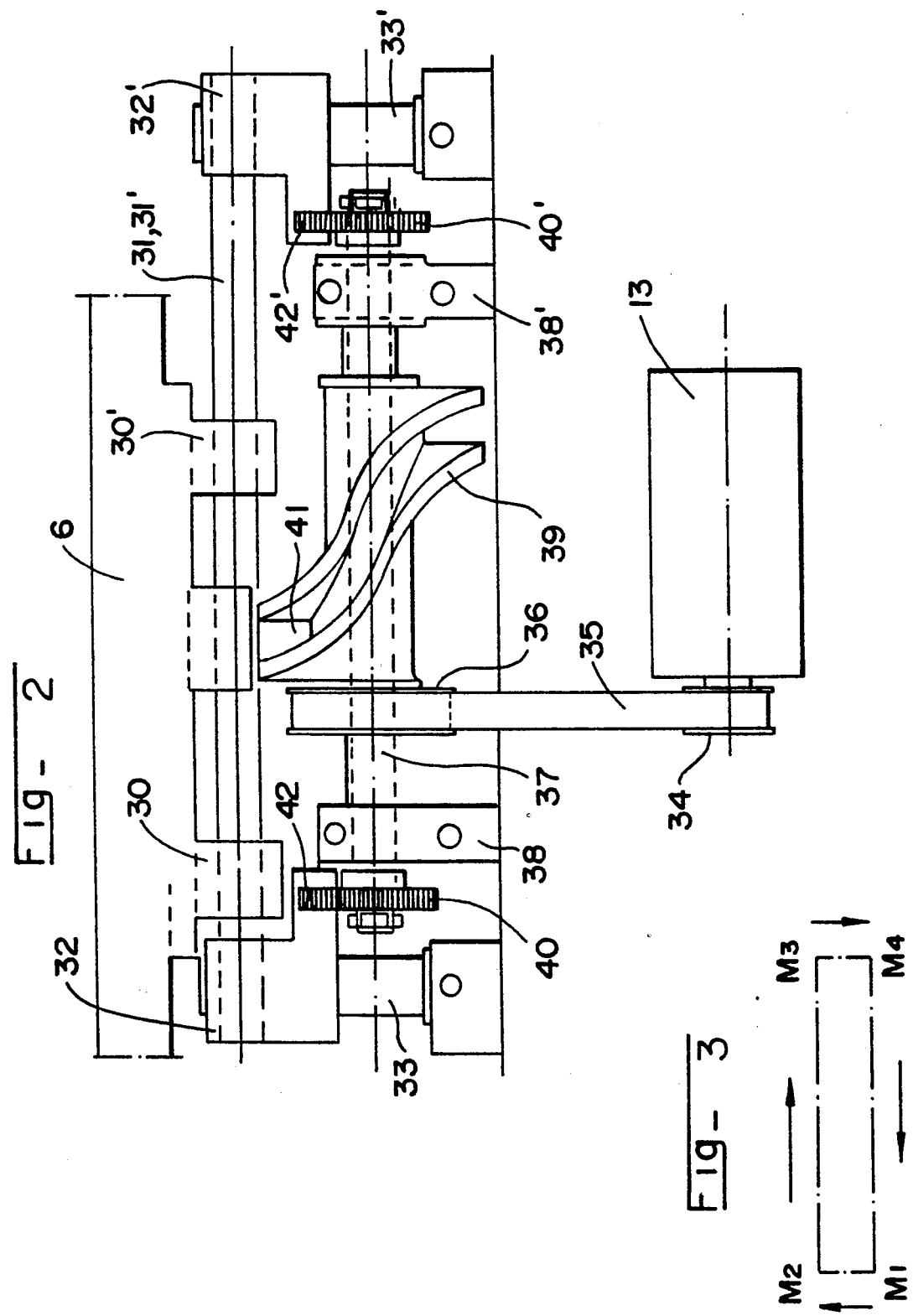

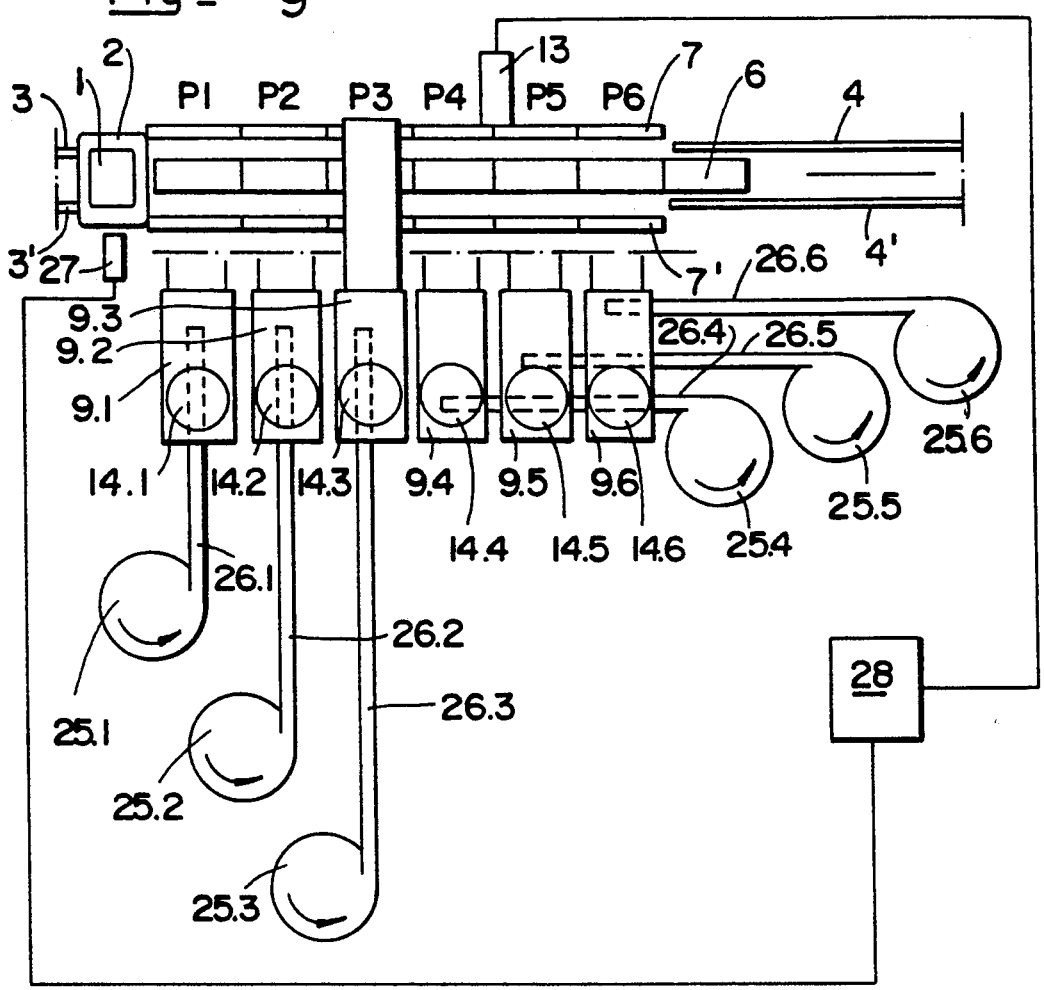
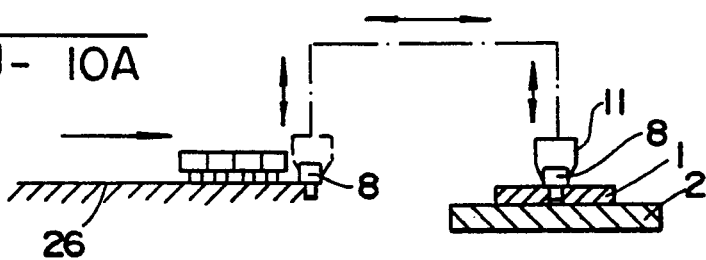
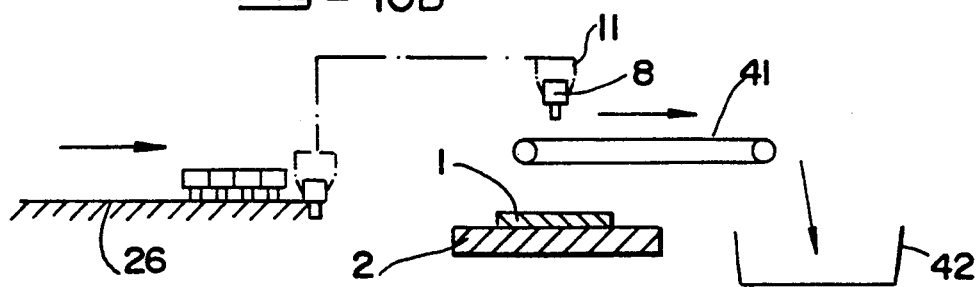

FLEXIBLE PRODUCTION SYSTEM COMPRISING INDIVIDUALLY MOTORIZED MECHANICAL MODULES WHOSE OPERATION IS SELECTED AND SYNCHRONIZED BY ELECTRONIC MEANS

This is a continuation of application Ser. No. 07/413,076 filed Sep. 27, 1989, now abandoned.

BACKGROUND OF THE INVENTION

The object of the system according to the invention is to achieve both a high operating rate and a high level of flexibility, on automatic equipment fed by a conveyor of the free transfer type. This equipment is found notably in series assembly workshops.

A general feature of this equipment is that it is composed of:
- a lift and carry module which presents and accurately locates the product being assembled successively on a certain number of workstations. This module operates in conjunction, upline and downline, with conveyors of the free transfer type, which feed it and clear it, and which provide the links between a given equipment unit and the neighboring equipment units belonging to one and the same production line.
- a certain number of working modules equipping the workstations supplied by the lift and carry module, and corresponding to the operations involved in the production process. These operations fall into three major categories:
  - component pick and place
  - operations implementing a given technological process: welding, crimping, machining, screwing, etc.
  - checking operations.

In some cases, the manufactured product can be directly transported via the conveyors to the machines. More often than not, it has to be placed on functional palettes. Although the invention is applicable to both cases, it will be assumed in the following description that the system comprises palettes. The present evolution of products and management methods results in the need for high performances in two fields in particular:
- production rate, made necessary by the increased volumes and the aim of reducing unit costs,
- flexibility, imposed by the diversity of market requirements which make it necessary to create a large number of alternative versions of a given product, and the requirements of modern management which aims to reduce stocks, and therefore to manufacture these alternative versions in small batches.

There are at present no machines on the production equipment market with high performance ratings in both these fields.

Air-operated machines, traditionally the most common, are slow (usual operating rate about 1000 cycles per hour). They do however enable the operating sequences to be easily adapted, which gives them a useful flexibility potential.

A second family of machines is constituted by mechanical machines with cams, organized around a central drive system which drives all the modules (lift and carry and working modules) by means of a common transmission system. These machines reach high operating rates (2000 to 3000 cycles per hour) but their operation is extremely rigid due to the fact that all their movements are mechanically interconnected. Their flexibility potential is therefore very low.

The purpose of the present invention is to define a principle of a machine which will combine the advantages of speed and flexibility, as well as a certain number of constructive arrangements relating to this type of machine.

SUMMARY OF THE INVENTION

The following two main principles are implemented within the scope of the invention:
- generation of movements by a mechanical-type technology, notably using cams.
- development of a machine made up of modules which are mechanically independent from one another, each module having its own individual motor, synchronization of the overall assembly being performed by electronic means.

The first principle results from the observation that among all the known technologies enabling more or less complex movement sequences to be achieved, the mechanical technology with cams is the one that enables the highest operating rates to be achieved, with good safety and reliability conditions. This advantage does not seem likely to be questioned in the foreseeable future. Moreover, the very wide variety of possibilities available in the shape of the cams enables the movement kinematics to be controlled perfectly, without increasing the complexity, and therefore enables the movements to be adapted to the particular problems arising from each module.

The second principle aims to avoid the drawback already mentioned with respect to cam-system machines with an overall transmission system, i.e. rigid operation offering very little scope from the flexibility standpoint. According to the invention, each module (lift and carry module or working module) forms a mechanically independent machine sub-assembly, i.e. fitted with its camshaft and its own motor. Like any other cam system, a module of this kind operates in cycles, a cycle corresponding to a camshaft revolution. Control of the assembly is performed by a central system which we will assume in the following takes the form of a programmable controller. Control of a given module is extremely simple: it consists in sending this module, in due time, the order to perform a cycle. On receipt of this order, a module previously at rest performs a cycle, i.e. a camshaft rotation. When this cycle has been completed, if no new order is received, the module is reset to the rest position (intermittent type operation). If a new order arrives before the end of the cycle in progress, the module remains in movement to perform a new cycle, continuing so long as orders are received (continuous type operation).

The machine is thus provided with great flexibility of operation in so far as such a module can be rendered active or inactive at will, depending on the situations which arise. It is on this property that the flexibility of this type of machine will be based, and it will be seen further on how this flexibility can be achieved.

Beforehand, to make the explanations clearer, a certain number of constructive measures relating to the modules will be examined.

Generally, a module essentially comprises:
a certain number of moving parts, corresponding to the functions to be carried out, a camshaft driving these moving parts, and comprising as many cams as there are movements to control, and a motor driving this camshaft via a suitable transmission system, making it perform cycles in an intermittent or continuous manner, as set out above.

The following will deal with modules configured in this manner. It should however be pointed out that some modules may be actuated differently, either partly or wholly, in particular by movements of small amplitude of the "all-or-nothing" type. It can be imagined that actuation be based on another principle: air-operated or electromagnetic, for instance. It is even possible for some modules, notably checking modules, not to involve any movement at all.

A standard module with cams comprises a particular position called "standby position". This is the position in which it is immobilized when it is at rest. An operating cycle consists in starting from this position and in returning thereto after a camshaft rotation has been performed. As operation of the modules must be able to be independent from each other, the standby position of each one must be chosen in such a way that it does not hinder operation of the others.

As far as the choice of the motor is concerned, the "step by step" technology is particularly well-suited to this type of work, in so far as it makes it possible to perform rotations of a perfectly controlled amplitude, and to stop in a very precise position. Using other types of motors, for example direct current motors operating in conjunction with rotary coders, would not however depart from the spirit of the invention.

Giving a detailed description of all the types of modules that could exist is obviously out of the question. Only two of them will be described in detail here: the lift and carry module, and the pick and place module, which is the type of working module most frequently encountered in automatic assembly.

The functions to be fulfilled by the lift and carry module are as follows:
lifting the palettes supplied by an upline conveyor.
carrying the palettes successively to the different workstations, at the required rhythm and with the accuracy required,
removal of the palettes on a downline conveyor.

The conveyors are generally of the "free transfer" type, i.e. the palette feed on the upline side is random. There may be a build-up of palettes upline from the machine, in which case the speed of the conveyor must enable them to be renewed in a shorter time than the machine cycle, so that the latter can operate in continuous mode, and therefore with its maximum output. There may also be periods without feed during which the machine must logically be shut down. Between these two extreme situations, all the intermediate situations can be encountered, characterized by intermittent palette inputs, to which the machine obviously must adapt. On the downline side, two types of situations can be met with: a free conveyor enabling the machine to operate, or the presence of a build-up phenomenon beyond a certain critical point, resulting in the machine having to be shut down.

In most equipment used at present, the palettes are conveyed to the machine by a conveyor, each workstation being equipped with an indexing device, enabling the palettes to be stopped and placed for the operation to be performed. This principle presents a basic drawback when high output rates are aimed for: transfer of the palettes by a conveyor does not enable their movement to be controlled perfectly: there is a problem of sliding when acceleration takes place, and a problem of impacts when the palettes come up against the stop. These impact problems are particularly serious in an automatic assembly process, where the product conveyed is often in a state of relative instability; they are aggravated by the necessity of moving the palettes at high speed, in order to achieve the output rate aimed for.

For this reason, the lift and carry principle implemented within the scope of the present invention will be that of the "walking beam", characterized by the presence of a moving part common to all the workstations, this part being animated with a to-and-fro movement enabling it:
to lift all the palettes and move them one step when downline travel takes place,
to return empty when upline travel takes place, this phase being the one during which the palettes are stopped on the work-stations, and therefore able to receive the corresponding process operations.

In a system of this kind, the longitudinal movement step constitutes the basic dimensional parameter, it being compulsory that the distance between two consecutive workstations correspond to a multiple of this step.

Various embodiments of the walking beam are possible without departing from the scope of the invention. The most simple will be dealt with in the present description, wherein the moving part is a support rule which can receive n+1 palettes, n being the number of placing stations existing on the machine, which will be assimilated for the sake of simplification to the number of workstations, assuming that all these stations are occupied. The support rule is animated with a rectangular cycle movement in a vertical plane, the four phases of which are:
upward movement, in the course of which the rule picks up all the palettes present on the stations, plus the one which is against the stop on the upline conveyor,
horizontal transfer one step downline,
downward movement, in the course of which the palettes are placed on the workstations, except for the last one which is placed on the downline removal conveyor,
horizontal return upline, empty, a phase during which the working operations can be carried out.

Operation of such a device assumes that there is an interference zone, both upline and downline, between the travel of the rule and the area fed and cleared by the conveyors. The latter will therefore have to be, at least locally, of the "twin-belt" type, between which the rule can engage (as an alternative embodiment, it could be imagined that the conveyors be of the single-belt type, and the rule be double).

Throughout the time they are on the machine, the palettes are handled mechanically, i.e. located accurately by suitable positioning components (for example centering pins) both on the moving rule and on the fixed workstations. This particular feature, notably as far as the rule is concerned, enables the transfer movements to be strictly controlled, notably in the acceleration and deceleration phases, enabling this transfer to be performed at high speed while avoiding problems of skating and especially of horizontal impacts.

Another source of impacts is to be found in this type of mechanism: this involves vertical impacts undergone by the palettes when they are picked up by the rule, and when they are placed by the latter on the fixed working plane. Indeed, the upward and downward movement phases must be kept as short as possible in order not to encroach too much on the transfer and working times. As the contact phenomena indicated above are located around the middle of these phases, it is clear that, if no special precautions are taken, they will occur at the moment when the vertical speed of the rule is close to its maximum.

An efficient solution to this problem consists in using the great flexibility provided by the shape of the cams to arrange a low-speed zone in the approach area. The space-time diagram of the vertical travel, instead of having an acceleration phase and a deceleration phase, will then comprise five phases: acceleration, deceleration down to reduced speed, low-speed zone, reacceleration, final deceleration. In order not to be hampered too much by the shortness of the time allocated to the sheer vertical travel, the time available can be considerably increased by accepting overtravels on both sides of this sheer vertical travel, the time devoted to these overtravels being found by overlapping with the horizontal movement phases.

This results finally in a transfer device which does not generate either horizontal impacts or vertical impacts, which is an indispensable condition to reach high throughput rates.

The pick and place module essentially comprises a pick and place handling unit the function of which is to pick a component up from a pick-up point and to go and place it on the product being manufactured, itself placed on the palettes. Up-line from the pick-up point there is a feed line and a distribution device (a vibrating bowl feeder for example) the technology of which can be conventional, provided that it enables the throughput rates aimed for to be achieved. The handling unit itself is conventional in form with a reverse U cycle, therefore like the walking beam, a combination of two perpendicular movements which have to be produced by the cams. In addition to these two main movements, a gripping part has to be controlled, which can also be achieved by means of a cam, but also more simply by air-operated or electromagnetic action, on account of the small amplitude of movement to be achieved.

If it is admitted that the lift and carry device cycle acts as time reference, the pick and place handling unit cycle must be located with respect to the former in such a way that the "place" operation takes place during the return phase of the walking beam rule, the rest of the cycle being deduced therefrom. As far as the standby position of the handling unit is concerned, the latter must take place at a moment when the working part (here the grip) is well clear of the circulating area of the product conveyed by the palettes, so that transfer of these palettes can be performed in all cases, whether the handling unit is active or not. This remark is naturally valid for any other type of working module. These synchronization problems are managed by the machine controller, programmed accordingly in accordance with the rules of the art well-known to specialists.

If we now go on to deal with the flexibility problem, it will be seen how being able to render a working module active or inactive at will provides the solution.

If we assume that the product to be manufactured has, with respect to a given operation, a number of alternative versions p, we can imagine devoting an equivalent number of workstations to this operation, each of which will be dedicated to one of the alternative versions. Depending on the version involved, the corresponding working module then just has to be rendered active, the others being kept inactive in their standby position. All the corresponding programs will have to be stored in the machine controller memory, selection being able to be performed by a manual call if human operation is permissible to start each new alternative version, or automatically if this is not the case. Although both these methods remain within the scope of the invention, it will be assumed in the following that selection is automatic, which requires coding of the palettes (or at least of the first palette in a given series) and a reading device of this coding equipping the palette lifting station, upline from the machine. This device, once it has read the code relating to the version involved, communicates the information to the operation controller, which deduces therefrom which program is to be activated. The complexity of the problem is accentuated by the existence of an intermediate phase occurring between the moment when the first palette of a version V2 arrives upline from the machine, and the moment when the last palette of the preceding version V1 is removed on the downline conveyor. During this phase, the versions V1 and V2 are present at the same time on the machine, their interface moving progressively downline. The transition between the two operating programs therefore does not take place at a precise moment, but from station to station, as the interface moves. This progressive management, which is fairly complex as far as programming of the controller is concerned, is nevertheless quite possible to achieve, and enables the successive versions to be sequenced without human intervention and without wasting time.

In the cases when there are a large number of alternative versions, the above solution can become very cumbersome due to the number of workstations to be implemented for a single operation. An easier solution then consists in providing two workstations only, A and B, and in using them alternately, one being in operation and the other one preparing the next series. In the case of an insertion operation, if workstation A is processing the version V2, preparation of workstation B consists in emptying it of the components relating to the previous version V1, and in refeeding it with the components relating to the version V3 which is to follow. When the version V2 is finished on A, the switch-over to B and to the version V3 can then take place automatically. Workstation A will then in turn switch to preparing for the following version V4.

A particularly difficult problem met with in a preparation phase is that of fully emptying the pick and place handling unit feed line, which is in fact very difficult to access. An efficient solution consists in having the operation performed by the handling unit itself, by modifying its cycle to stop the vertical insertion travel, and to release the components in the up position instead of placing them on the product. A removal line then merely has to be fitted provisionally to recover the components and send them to a recovery container. This method, made possible by the availability of the handling unit equipping the workstation in the preparation phase, is particularly advantageous, for it results in the emptying operation being performed automatically, and therefore enabling it to be performed at the same time on several stations of the same machine, which limits the need for personnel and enables the overall preparation time to be reduced.

The same kind of reasoning can be applied to the "process" working modules (welding, crimping, shaping, machining, etc.) either by equipping p stations corresponding to p versions, or by equipping two stations A and B working alternately. In the latter case, it can be envisaged that these two stations occupy two positions (consecutive or not) of the lift and carry module, and that they are both mounted on a movable structure with transverse movement enabling them to be moved forward to the working position or on the contrary to be withdrawn to a preparation position allowing easy, risk-free access for the personnel. In another alternative embodiment, only one of the lift and carry module positions is occupied, and the two working modules are mounted on a rotating structure with two positions 180 degrees apart, enabling them to be presented alternatively in the working position and in an opposite preparation position.

BRIEF DESCRIPTION OF THE DRAWINGS

Other advantages and features will become more clearly apparent from the following description of an illustrative embodiment of the invention, given as a non-restrictive example only and represented in the accompanying drawings, in which:

FIG. 2 is an elevational view showing the details of a walking beam kinematic system;

FIG. 3 is a schematic representation of the rectangular cycle of a walking beam;

FIG. 9 is a schematic plane view of a machine with a high level of flexibility achieved by multiplication of the workstations;

FIG. 10 is a transverse sectional view showing the normal cycle of a pick and place handling unit;

FIG. 10a is the same view of the same handling unit used to empty the feed system;

DESCRIPTION OF THE PREFERRED EMBODIMENT

Figure 1:
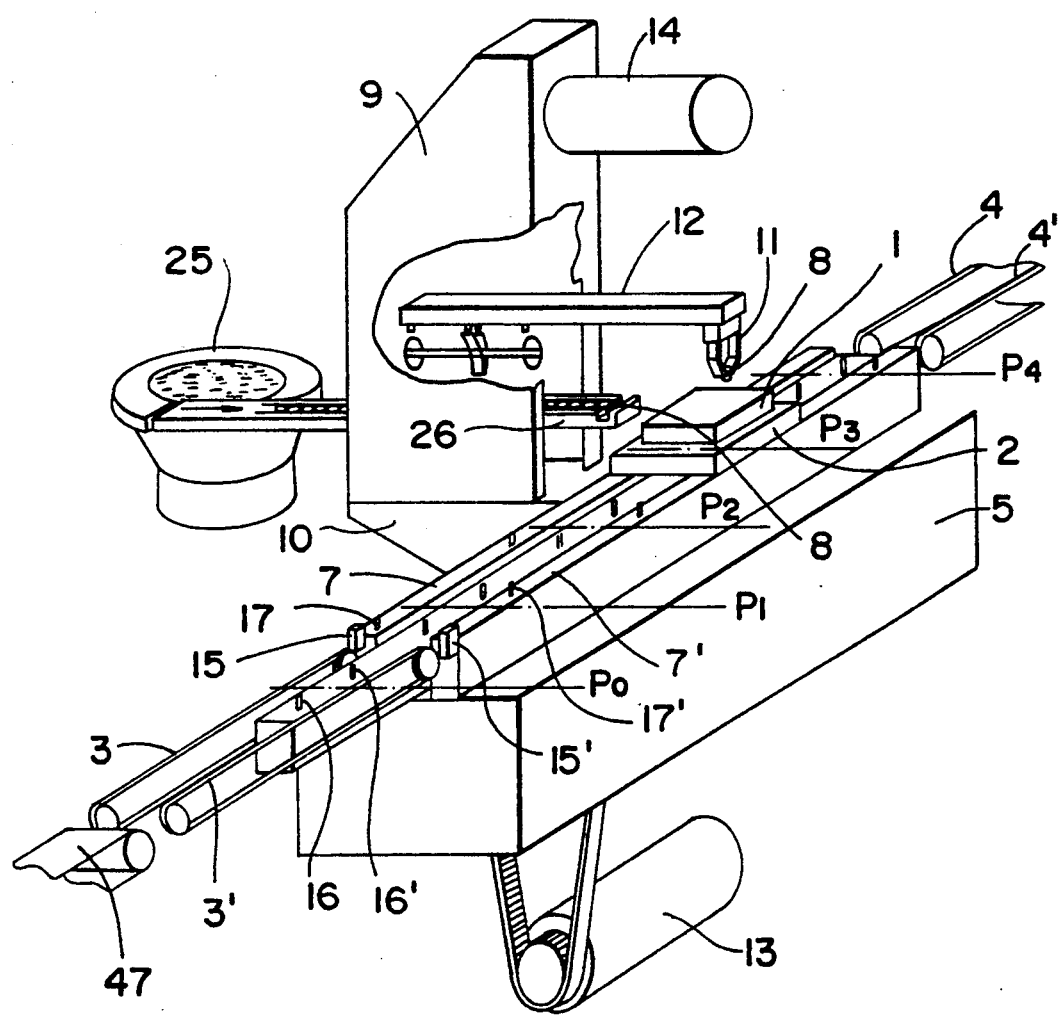
FIG. 1 is a partial perspective view of a machine according to the invention.

FIG. 1 shows the product which is being manufactured placed on the support palette 2 (a single palette is represented for the sake of clarity of the drawing). The palettes are picked up by the upline conveyor with twin belts 3, 3', and removed by the downline conveyor 4, 4'.

The lift and carry device 5 essentially comprises the movable rule 6 and the fixed supports 7, 7'. The rule is represented in the up-line low position, i.e. it is engaged between the belts 3, 3' of the upline conveyor. This position can advantageously be chosen as the standby position when the system is not operating.

The number of work positions fed by the system can be any number. In the present example there are four, referenced P1 to P4. For the sake of clarity of the drawing, only the position P3 is equipped with a working module, but it is obvious that the other positions can also be equipped. The position P0 has to be added to these positions, in which position the palettes are still on the upline conveyor, bearing against the stops 15, 15' securely united to the fixed supports 7, 7'. It is in this position that the palettes will be lifted by the moving rule 6 when the latter performs its upward movement. Positioning of the palettes on the rule will then be performed by the centering pins 16, 16' cooperating with housings provided on the palettes. When the palettes are then placed on the work position P1, they are centered by means of another couple of housings on the centering pins 17, 17', borne by the fixed supports 7, 7'. The couples of pins such as 17, 17' are to be found in each of the positions P1 to P4. The couples such as 16, 16' are located on the rule one more time, i.e. 5 times, to take account of the position P0. When the rule moves upwards, all the palettes occupying the positions P0 to P5 are lifted by a height slightly greater than that of the pins 17, 17' and of the stops 15, 15'. The rule then moves one step downline taking the palettes with it. Then it performs its downward movement in the course of which the palettes are placed on the work positions P1 to P4 for four of them, and on the downline conveyor for the last one. The downward movement of the rule must be sufficient to disengage the pins 16, 16'. Finally, the rule returns upline to the position in the drawing, ready to start a new cycle. In the meantime, the conveyor 3, 3' has had time to lift a new palette in the position P0, provided that the palette was waiting against the previous one.

In the device described above, the conveyor belts 3, 3' and 4, 4' are independent from one another. An alternative embodiment could be imagined, without departing from the scope of the invention, wherein a single conveyor is fitted for the whole machine, the belts then passing via the free spaces between the rule 6 and the supports 7, 7', at a slightly lower level than the plane of these supports, so as not to hinder placing of the palettes.

It should also be noted that upline from the conveyor 3, 3' the end of another conveyor 47 is represented, the latter being better suited to linking between the machines (notably as far as the ability to describe curves is concerned) whereas the conveyor 3, 3' is a straight part of short length forming an integral part of the machine.

The component to be inserted 8 is picked up by the handling unit 9, placed on the console 10, itself securedly and accurately united to the lift and carry unit 5. The handling unit is fitted with a grip 11 fixed on a movable arm 12, animated with an alternating movement with reverse U kinematics. This cycle enables the grip 11 to pick up a component 8 at the end of the feed line 26, and to place it on the product 1. The components 8 are assumed here to be distributed by the vibrating bowl feeder 25, but could be distributed by any other suitable device.

The lift and carry device 5 and the handling unit 9 are respectively actuated by the motors 13 and 14. Their kinematics are totally independent, their synchronized operation being achieved by electronic means 28 (FIG. 9), such as a programmable controller.

The movable rule 6 and details of a kinematic drive system with a rectangular cycle are shown in FIG. 2. The rule 6 is securely united to guide blocks 30, 30' sliding on parallel horizontal rods 31, 31', which form a rigid assembly with the blocks 32, 32', which are themselves guide blocks sliding on the vertical rods 33, 33'. The rule 6 therefore has in fact two degrees of freedom in both the horizontal and vertical directions. The drive is provided by the motor 13 (possibly with a reducing-gear incorporated) and passes via the pulley 34, the notched belt 35, and the pulley 36 itself wedged on the camshaft 37, supported by the bearings 38, 38'. The shaft 37 supports the helicoidal cam 39 which generates the horizontal movement, and the flat cams 40, 40' which generate the vertical movement (the cams 40, 40' have the same profile, and they are only fitted double so as to correctly provide the vertical support for the movable assembly 31, 31', 32, 32'). The horizontal cam 39 cooperates with the roller 41 securedly united to the rule 6. It should be noted that the height of this roller and its penetration into the throat of the cam 39 are sufficient to tolerate vertical movement without becoming disunited. The vertical cams 40, 40' cooperate with the rollers 42, 42' securedly united to the blocks 32, 32', the return being ensured by the weight of the movable assembly (which can be reinforced by springs if necessary). As far as the horizontal movement is concerned, the return is provided by the cam itself, which has a dual effect.

The movement generated by the device described above is represented in FIG. 3. In conventional kinematics, it is a purely rectangular cycle, i.e. not comprising any overlap period between the different phases. The respective times taken by these phases are to be optimized according to the permissible accelerations. It is also necessary to make sure that the duration of the return phase (M4-M1) is sufficient to enable the work operations to be placed during this phase. Considering these various constraints, times of 0.35 s for the horizontal phases and 0.15 s for the vertical phases will be admitted for a total cycle time of 1 second (these figures are given as an indication only).

Figure 4:
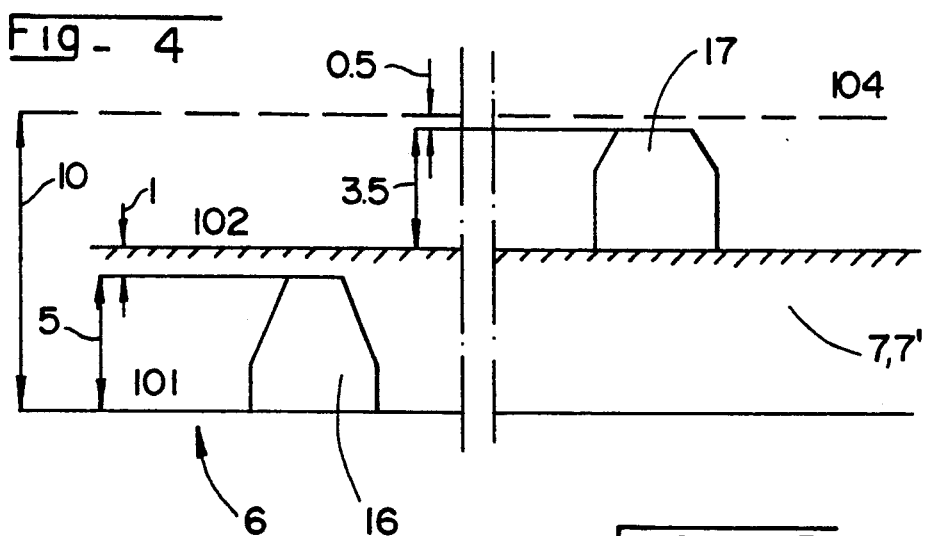
FIG. 4 is a large-scale cross-section showing the relative arrangement of the fixed and movable positioning pins.

In FIG. 4, the movable rule 6 bearing the centering pins 16 and the fixed supports 7, 7' bearing the centering pins 17 are represented. The drawing shows 3 horizontal planes:

101: plane described by the rule in the down position
102: fixed supports plane (it will be assumed that this is also the plane of the upline and downline conveyors)
104: plane described by the rule in the up position.

The location constraints of these different planes are as follows:

the gap 101-102 must be greater than the height of the pins 16, so that the latter can pass under the palettes when the rule returns.
the gap 102-104 must be greater than the height of the pins 17, so that the palettes can pass over these pins during their transfer.

Figure 5:
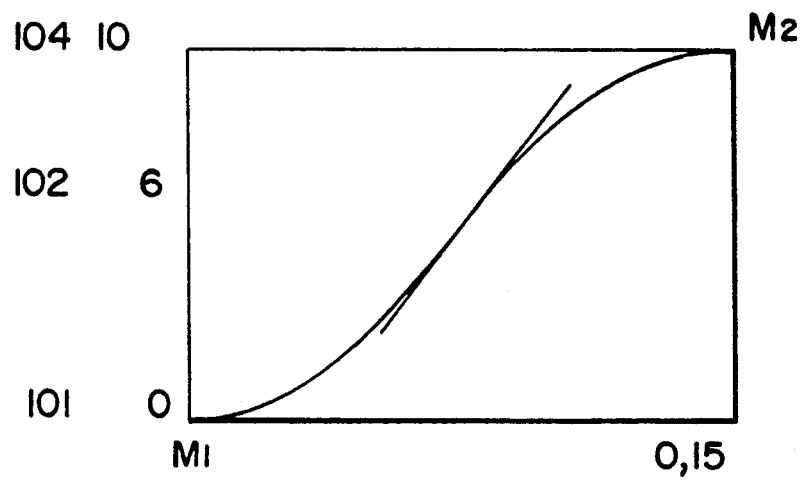
FIG. 5 is a space-time diagram of the vertical travel of a walking beam with conventional kinematics.

The total vertical travel of the rule has been taken as being equal to 10 mm, a figure given as an indication only, as are the other dimensions in the drawing. On account of the constraints set out above, the plane 102 is located not far from the middle of this travel. Yet it is at this very level that the vertical contact phenomena involving the palettes will occur, i.e. lifting by the rule, and carrying to the supports 7, 7' and the downline conveyor. In a conventional kinematic system, these impacts will take place at a speed close to the maximum speed, as is shown by FIG. 5. This figure shows that if the travel M1-M2 of 10 mm is described in the time of 0.15 s starting and finishing at zero speed, and allowing for an acceleration and a deceleration phase, the speed at which the level 102 will be passed will be high (here in the order of 0.125 m/s).

Figure 6:
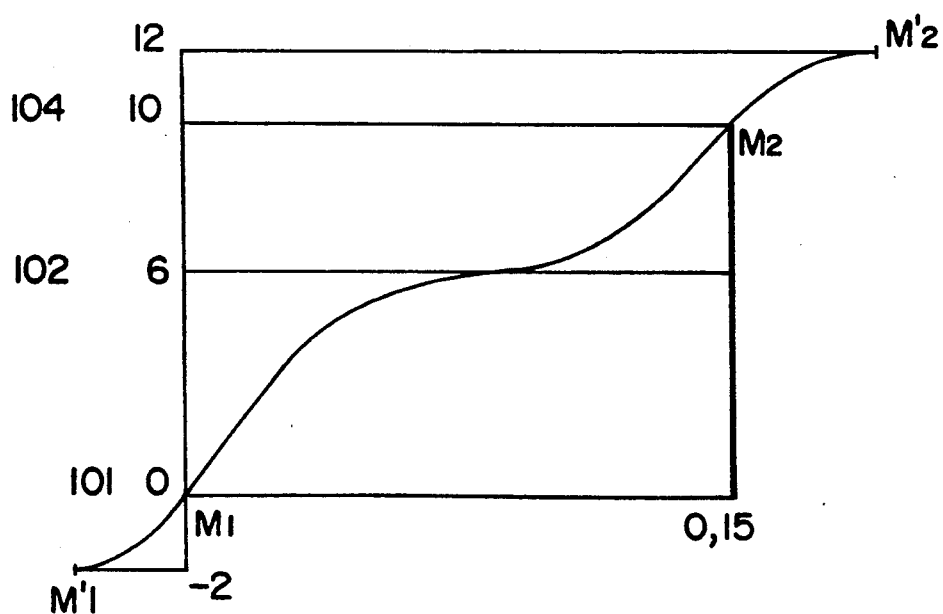
FIG. 6 is a diagram of the same vertical travel as in FIG. 5 with improved kinematics.

A substantial improvement can be obtained by increasing the vertical movement of the rule 6 by overtravels situated on either side of the points M1 and M2, and by making these overtravels occur during periods of time taken by overlapping on the horizontal travel which precedes and which follows the vertical travel M1-M2. A vertical space-time diagram according to FIG. 6 is thus obtained, where overtravels of 3 mm have been introduced on either side. It can be seen that the sheer vertical travel still takes place during the same lapse of time of 0.15 s. However, the fact that the overall travel of 14 mm starts earlier (at M'1) and finishes later (at M'2) enables the points M1 and M2 to be passed at fairly high speeds, which makes it possible to arrange a low-speed zone (in the order of 0.02 mm/s) at the 102 plane level, which practically eliminates the problem of vertical impacts inflicted on the palettes.

The diagrams presented in FIGS. 5 and 6 relate to the upward travel M1-M2. They would be identical for the downward travel M3-M4, with a symmetry difference.

Figure 7:
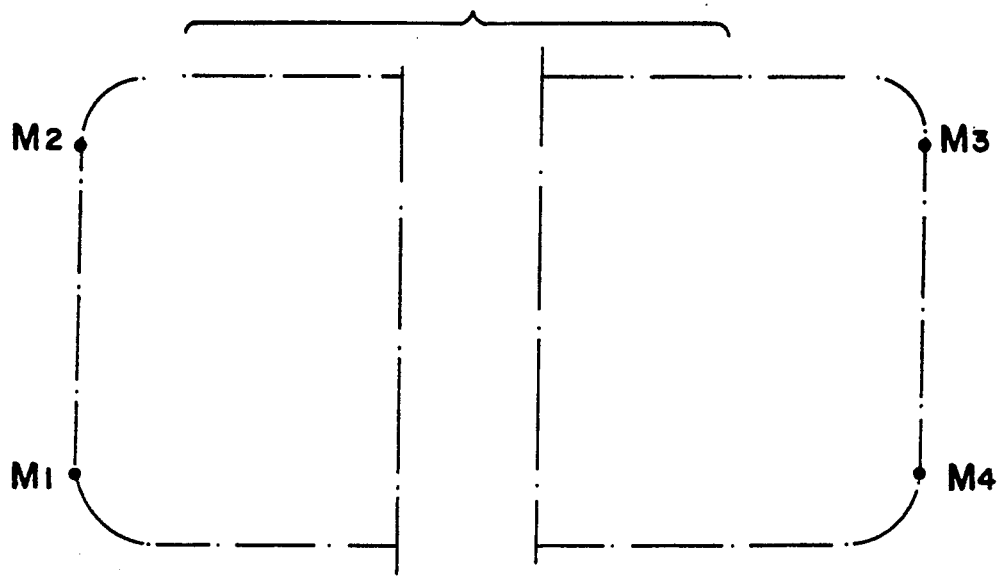
FIG. 7 is a schematic representation of the rectangular cycle with improved kinematics.

As far as the geometric shape of the movement of the rule 6 is concerned, this now takes the form of a rectangular cycle with rounded corners, as is shown by FIG. 7. It can be seen that the travels M1-M2 and M3-M4 remain purely vertical, which guarantees correct engagement and disengagement of the centering pins 16 and 17.

If the handling unit 9 is now considered, its mechanism will not be described in detail, as it is of the kind represented in FIG. 2. It will comprise, as for the walking beam, a cam generating the horizontal movement and a cam generating the vertical movement. Unlike the walking beam, there is no need to provide an intermediate low-speed zone, since the lift and carry operations of the component 8 are performed at the end of the vertical travel, and therefore at a time when the speed is naturally low.

A morphological constraint concerning the handling unit involves its dimensions transversely to its movement (or longitudinally to that of the lift and carry module). If the available workstations are to be used to the full, the handling units must be able to be placed on consecutive stations, which means that their dimensions must be smaller than the lift and carry module step. It is for this reason that the motor 14 has been placed parallel to the arm 12 (see FIG. 1). It could also have been fitted with a vertical axis.

As far as the movement of the grip 11 is concerned, this could be generated by a third cam, which would result in a fairly complex mechanical linkage system. Considering the small amplitude involved, air-operated or electromagnetic actuation is sufficient.

Figure 8:
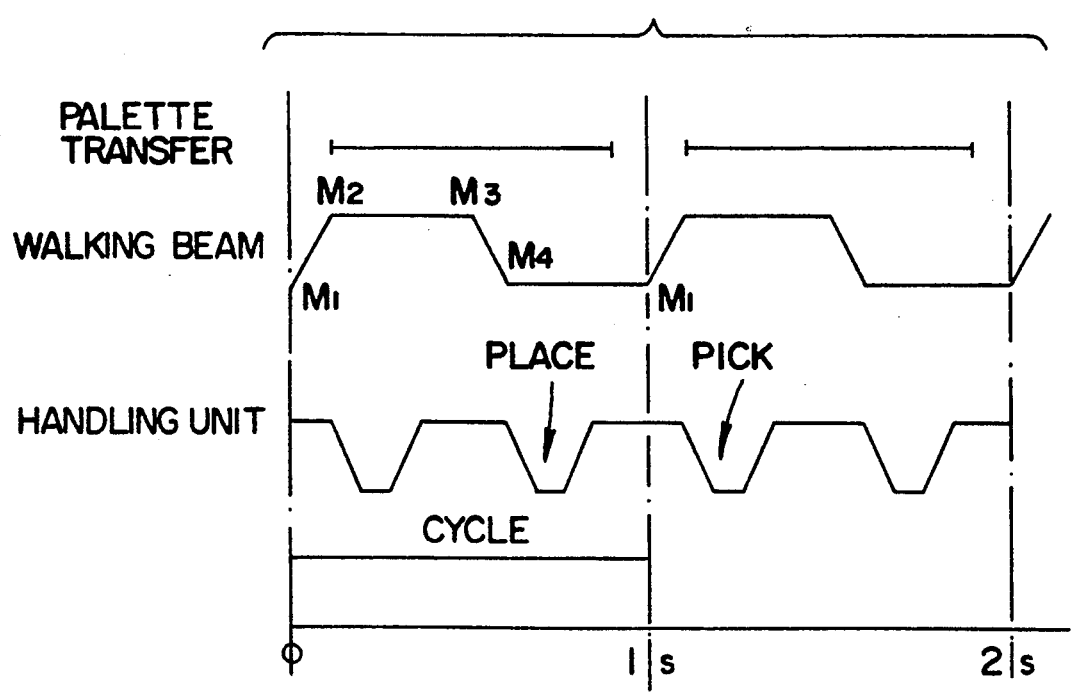
FIG. 8 is a schematic diagram showing the relative positioning of the cycles of the lift and carry module and of a pick and place handling unit, and transfer of the palette onto the upline conveyor.

The cycle of the handling unit 9 is shown in the diagrams in FIG. 8, where it is presented along with that of the lift and carry module. In these space-time type diagrams, the y-axis corresponds to the vertical movements, so that the latter are represented schematically by oblique segments, whereas the horizontal movements are represented by horizontal segments. The essential constraint to be complied with is that the handling unit "place" phase takes place during the return travel M4–M1 of the walking beam, the rest of the cycle placing itself accordingly. As far as the standby positions are concerned, it can be seen that, if the position M4 has been chosen for the walking beam, the handling unit is at this moment in the up position and in the withdrawal phase, which constitutes a correct standby position. The stop and restart moments of the two devices can therefore be simultaneous. It should however be noted that this is not compulsory and that, for another type of working module with different requirements, these moments may not be simultaneous. This is another advantage provided by electronic synchronization with respect to the overall kinematic chain.

FIG. 8 also gives a "palette transfer" diagram showing the time limits available at upline conveyor level to renew the palettes. This time limit starts from the moment corresponding to M2, i.e. when the palette picked up by the walking beam starts its travel downline, allowing the next one on the conveyor to start. This new palette then just has to come up against the stop slightly before the next point M1 in order to be able to be picked up in turn. The time available is therefore quite close to the total cycle, which is an important advantage over standard indexings, in so far as the speed of the conveyor can remain moderate. To give an example as an indication, if the length of the palettes is 100 mm and the cycle time is 1 s, 0.8 s of which can be devoted to the transfer on the conveyor, the speed of the latter has to be greater than 0.1/0.8, i.e. 0.125 m/s, a fairly moderate figure, which does not give rise to serious problems of horizontal impacts.

The figures which follow illustrate the possibilities of the system according to the invention in the flexibility field. FIG. 9 represents a machine dedicated to a pick and place operation involving six alternative versions. The machine comprises six workstations, P1 to P6, occupied by the handling units 9.1 to 9.6 fed by the vibrating bowl feeders 25.1 to 25.6 and the feed lines 26.1 to 26.6. Each vibrating bowl feeder is fed with one of the six versions of the component to be placed. When a palette 2 supporting the product 1 of a given version comes up against the upline stop on the conveyor 3, 3', the identity of the version to be processed is read by the sensor 27, which assumes that the palettes have received a coding at the head of the line. Coding principles are well-known in the art (electronic label, optic coding, etc.). In some cases, the coding can be carried by the product 1 itself, and not by the palette. When the version has been recognized, the sensor 27 sends the information to the machine controller. The latter then ensures that only the workstation required by the version in question is activated when the palette passes, the others remaining inactive. It will for example be station P3 equipped with handler 9.3 (for the sake of clarity of the drawing, the other handling units have only been partially represented). As there is no re-reading of the code once the palette has been fed onto the machine, the controller proceeds by counting the cycles in order to follow its progression.

The flexibility achieved by this method is total, i.e. the different versions can follow one another in a perfectly random order without the production rate being affected. However, its drawback lies in the multiplicity of workstations to be equipped. If production takes the form of series of a reasonable length, it could be advantageous to choose to equip only two workstations A and B occupying for example the positions P1 and P2, one being in operation while the other is in preparation. A greater number of operations will then be able to be carried out on a single machine, which will reduce the surface area and cost of the production system.

In a pick and place operation, it has been seen that the preparation work consists in emptying the feed device of the components relating to the previous series and in replacing them by the components relating to the series to be performed. It is advantageous to be able to make the emptying operation automatic, firstly due to the inaccessibility of the feed line, but also because several workstations will generally have to be prepared at the same time, with reduced personnel. FIGS. 10 and 10a present a solution enabling emptying of a feed device to be achieved using the pick and place handling unit itself.

FIG. 10 represents the normal work of this handling unit, i.e. picking up a component 8 from the end of the feed line 26, performing its reverse U cycle, and then placing this component on the product being manufactured 1, supported by the palette 2.

FIG. 10a presents use of the handling unit with a view to emptying the feed system, while enabling the rest of the machine to operate, and notably enabling the palettes 2 supporting the product 1 to be conveyed. According to the invention, the double vertical travel corresponding to the placing operation is eliminated from the handling unit cycle. The grip 11 is opened when it is at the right-hand end of the horizontal travel, or even slightly before. Between this position and the zone reserved for the product to pass, there is sufficient clearance for a removal device to be fitted, presented here in the form of a mini conveyor belt 41, but which could also be a vibrating removal line, or even a simple inclined plane if enough space is available. This removal device is arranged so as to send the components 8 to a recovery container 42, the assembly 41–42 constituting a small, light piece of equipment which can be fitted and removed very quickly.

Obtaining the modified handling unit cycle does not cause any particular problem, especially if this piece of apparatus is equipped with a stepper motor. A small specific automation program merely has to be implemented reversing the direction of rotation of the motor each time the new handling unit stop position is passed. Starting from this position, the reduced cycles are therefore executed making the motor run alternately in its normal direction and in the reverse direction, and performing each time only a fraction of a camshaft turn corresponding to:

the horizontal withdrawal travel,
the double vertical pick-up travel,
the horizontal forward travel.

(the two horizontal travels can if necessary be reduced to save time).

Figure 11:
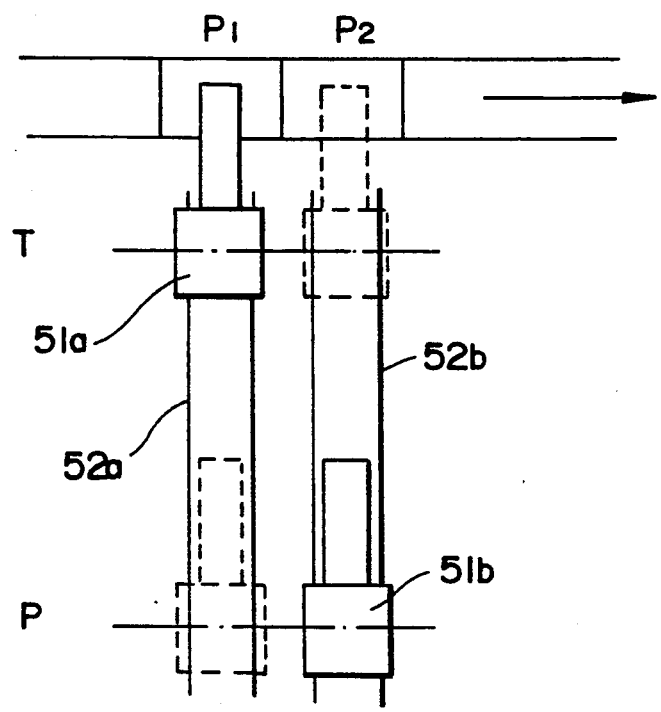
FIG. 11 is a plane view showing the organization of a double workstation dedicated to a process operation, wherein the working devices are mounted on slides with transverse movement.

In a process operation, the problem of preparation arises in a different manner depending on the nature of this operation. When this preparation requires manual intervention, it may be necessary to remove the working module in order to make it accessible. FIG. 11 presents a solution consisting in making the working modules 51a, 51b transversely movable with respect to the lift and carry device, making them for example slide on guiding slides 52a, 52b. While one of the modules (here 51a) is in the working position T, the other one is in the preparation position P. When preparation has been completed (this taking logically less time than is required for execution of the current series), the module 51b can be moved to the working position, next to the module 51a. A change of series can thus be achieved instantaneously. When this change has taken place, the module 51a can then be withdrawn and will in turn switch over to preparation.

Figure 12:
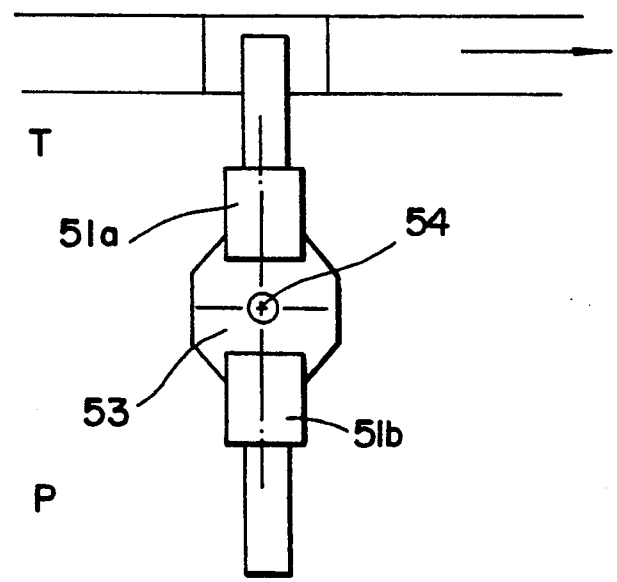
FIG. 12 presents a similar piece of equipment to that of FIG. 11, but with the working devices mounted on a rotating structure.

FIG. 12 presents an alternative embodiment wherein the two working modules are fitted back to back on a rotating structure 53, which can perform rotations of 180 degrees around an axis 54. Thus, as above, the module 51a is active while 51b is in the preparation position. At the end of the series being executed, a short break in production will have to be accepted during the time it takes to perform the 180-degree rotation which will switch the two modules over. This device therefore does not have quite as good performance as the previous one from the flexibility point of view, but it does have the advantage of rendering the two modules fixed with respect to one another, which may be advantageous in certain applications for which some elements may be common. This is the case for example for electric welding, for which a single generator can be used, itself mounted on the rotating structure 53, in order to minimize the high-current electrical connections.

We claim:

1. A production system capable of high speed operation and instantaneous adaptation to produce alternative versions of product being manufactured comprising:
   a fixed workstation support plane;
   a lift-and-carry module defining a linear path along said fixed workstation support plane, for conveying a plurality of products being manufactured along said linear path;
   a plurality of working modules disposed along said linear path and having separate camshafts and drive motors associated therewith, each of said modules being capable of performing an individual operation during a substantially common time period on a corresponding product being manufactured while said product is resting on said fixed workstation support plane in a position along said linear path corresponding to said working module;
   an upline product feed conveyor for providing said products being manufactured to an upline end of said lift-and-carry module;
   a downline conveyor for receiving said products being manufactured from a downline end of said lift-and-carry module;
   said lift-and-carry module comprising a support rule moveable in a rectangular cycle in a vertical plane, for periodically lifting each of said products being manufactured from its respective resting position on said fixed workstation support plane and for placing each of said products being manufactured in a position corresponding to a next working module, one step downline in said linear path from its previous position;
   said lift-and-carry module further comprising means for providing reduced-speed portions of vertical movement of said support rule, at a level corresponding to said fixed workstation support plane, such that vertical impacts harmful to said products are minimized;
   and wherein each of said plurality of working modules has two selectable states,
   a first of said two selectable states being an active state in which said modules perform operations on said products being manufactured,
   and a second of said two selectable states being an inactive state in which said modules do not perform operations on said products being manufactured;
   and wherein the production system further comprises an electronic control system for providing independent control of the function performed by each working module and synchronization of all said working modules and for selecting working modules to be rendered active, the providing and selecting operations being carried out through the cam shafts and associated drive motors of the working modules;
   such that each of said working modules can be controlled individually permitting high speed treatment of the products being manufactured and such that the production system may adapt instantaneously to processing alternative versions of said products;
   said production system further comprising a sensor, electrically coupled to said electronic control system, for determining which of said alternative versions is being manufactured at a given time and at a given position along said linear path.

2. A production system according to claim 1, comprising two working modules assigned to a given operation involving a plurality of alternative versions,
   wherein each of said two working modules has a working position and a preparation position;
   and wherein one of the two working modules is in said working position performing a first of said plurality of versions of said given operation, while the other of said two working modules is in said preparation position undergoing preparation for performing another of said plurality of versions of said given operation.

3. A production system according to claim 2, further comprising:
   a pick-and-place handling unit for performing an insertion operation;
   a feed device for supplying said handling unit with components to be inserted into said products being manufactured; and
   an emptying device for emptying said feed device during a preparation phase, without interrupting operation of the production system;
   said insertion operation involving picking up a component to be inserted and placing down said component into one of said products being manufactured,
   said handling unit additionally for performing, during said preparation phase, a reduced cycle in which a down-and-up vertical travel of said handling unit corresponding to aid placing down of a component is not performed.

* * * * *